Patented Jan. 3, 1939

2,142,220

UNITED STATES PATENT OFFICE 2,142,220

LUBRICANT

Erich M. Steffen, Jersey City, N. J., and John E. Schott, New York, N. Y., assignors, by mesne assignments, of three-fourths to Tide Water Associated Oil Company, New York, N. Y., a corporation of Delaware No Drawing. Application June 14, 1935, Serial No. 26,616

25 Claims. (Cl. 87—9)

This invention relates to lubricants, and more particularly is concerned with certain synthetic compositions of matter formed by the catalytic conversion of rubber and which are effective to impart valuable and desired characteristics to lubricating oils when blended therewith.

In a copending application of Erich M. Steffen, Serial No. 683,169, filed August 1, 1933, it is shown that the treatment of rubber with a catalyst such as anhydrous aluminum chloride produces stable conversion products which are exceedingly valuable in the production of high grade lubricating oils. Therein, it is also shown that such a catalytic conversion of rubber advantageously may be effected in the presence of chlorinated hydrocarbons.

The synthetic composition of matter produced in the foregoing operations proved generally valuable as blending agents for hydrocarbon oils, and exhibited particular utility in the production of lubricants having desired properties of low pour point and high viscosity index. It is an important object of the present invention, therefore, to provide improved methods of forming compositions of this character, whereby the same may be obtained in increased yield and may be enhanced in value and effectiveness.

To this and other ends, we now propose to effect the aluminum chloride conversion of rubber in the presence of hydrocarbons having a capacity for undergoing chemical change to more stable form when reactively contacted with a catalyst having the effect of anhydrous aluminum chloride.

We have discovered that the presence of these hydrocarbons occasions a markedly increased yield of valuable lubricating oil blending compositions from a given amount of rubber material; and it has also been observed that the aluminum chloride conversion products of rubber formed by our improved process are characterized by materially enhanced effectiveness in improving the quality of mineral lubricating oils. These advantages are obtained likewise when the improved process of the present invention is applied to a catalytic conversion of rubber in the presence of chlorinated hydrocarbons.

Hydrocarbons suitable for the purpose of the present invention may comprise such unsaturated compounds as the olefines and diolefines or may, if desired, be selected from hydrocarbon compounds of an aromatic nature which are similarly reactive in the presence of anhydrous aluminum chloride to form more stable conversion products. As a convenient and readily available source of such hydrocarbons, we have found it economically advantageous to utilize directly in our process such mixtures as cracking coil naphtha from tube and tank operations, gyro vapor phase cracked distillate, and the like. These source materials contain substantial amounts of the desired compounds.

In order that the features and advantages of the present invention may be clearly comprehended, we are presenting herebelow certain examples showing the production of synthetic compositions from rubber in accordance with our improved method. It is to be understood, however, that the particularized steps, materials, and proportions herein set forth are given by way of illustration and not by way of limitation.

EXAMPLE I

A tube and tank cracked distillate was fractionated to obtain a cracking coil naphtha, comprising about 67% by volume of the original distillate and having an A. P. I. gravity of 51.2, an initial boiling point of 214° F., and a final boiling point of 403° F. About 30% by volume of this naphtha was removable by absorption in 5% fuming sulfuric acid indicating the presence, in substantial proportion, of the hydrocarbons desired.

A rubber gel was then prepared by mixing 1000 grams of crepe rubber with 10 liters of a straight run Pennsylvania naphtha and allowing the mixture to stand for ten hours. To this gel, 14 liters of the above cracking coil naphtha were added and the mixture agitated while introducing 110 grams of anhydrous aluminum chloride. At the end of one hour the reaction mixture was heated to 160° F. at which point an additional 110 grams of anhydrous aluminum chloride were introduced, whereupon the temperature increased to 210° F. and was so maintained for two hours. The mixture was then permitted to cool and to settle.

Upon separation of the sludge a brown solution was obtained which, after treatment with lye and water, was subjected to steam distillation and yielded 1600 grams of a residual product readily soluble in lubricating oils. The synthetic composition so obtained was then blended with hydrocarbon oils and the following comparative characteristics noted. It will be observed that the blending agent, although used in relatively minor proportion, is quite efficacious in reducing the pour point of these oils.

|  | First oil | | Second oil | |
|---|---|---|---|---|
|  | Original | 1% blend | Original | 1% blend |
| Saybolt Vis. @ 100° F | 189 | 210 | 505 | 543 |
| Saybolt Vis. @ 210° F | 47 | 49 | 67 | 68½ |
| Pour point °F | 25 | −5 | 25 | −10 |

EXAMPLE II

A gyro vapor phase cracked distillate was fractionated to obtain a naphtha having a boiling range of 200° F. to 415° F. and comprising 72% of the original distillate. The latter had an A. P. I. gravity of 53.1, an initial boiling point of 96° F., and a final boiling point of 432° F.; an Egloff analysis on the same indicated unsaturates and aromatics present in the proportion of 81.4% by volume, making this a valuable source material for the hydrocarbons desired for the following operation.

A rubber gel was prepared, from 1000 grams of crepe rubber and 13 liters of a straight run Pennsylvania naphtha, to which was added 13 liters of the cracked naphtha derived as above from a gyro unit operation. The mixture was then agitated during the introduction of 120 grams of anhydrous aluminum chloride, and within one hour the temperature of the reaction mixture was raised to 160° F. at which time a second portion of 120 grams of anhydrous aluminum chloride was added. The temperature subsequently rose to 210° F. where it was maintained for a period of two hours.

After cooling and settling, the recovery methods of Example I yielded in the instant case 3300 grams of stable reaction products which proved effective in enhancing the quality of lubricating oils as indicated by the following comparative tests.

|  | First oil | | Second oil | |
| --- | --- | --- | --- | --- |
|  | Original | 1% blend | Original | 1% blend |
| Saybolt Vis. @ 100° F | 189 | 210 | 505 | 556 |
| Saybolt Vis. @ 210° F | 47 | 49 | 67 | 69 |
| Pour point °F | 25 | −15 | 25 | 0 | carbon lubricating oils in the manner indicated in the appended table.

|  | First oil | | Second oil | |
| --- | --- | --- | --- | --- |
|  | Original | 1% blend | Original | 1% blend |
| Saybolt Vis. @ 100° F | 189 | 201 | 505 | 512 |
| Saybolt Vis. @ 210° F | 47 | 48½ | 67 | 67½ |
| Pour point °F | 25 | −5 | 25 | −5 |

EXAMPLE IV

Here the source material for the desired hydrocarbons comprised an overhead gas oil taken from a fuel oil coking operation in a Knowles coke oven unit. The gas oil was redistilled to provide a 15% cut having an A. P. I. gravity of 48.0, an initial boiling point of 180° F., and a final boiling point of 440° F. This fraction showed 50% by volume of unsaturates and aromatics, and was added in the amount of 9 liters to a rubber gel formed with 1000 grams of crepe rubber and 16 liters of solvent naphtha. This mixture was then subjected to the action of anhydrous aluminum chloride introduced portionwise under the reaction conditions of previously reported experiments. Upon completion, a black sludge was removed from the reaction mixture, the solution neutralized with lye, treated with 2% of denatured alcohol, and reduced to obtain 2600 grams of conversion products. This composition was then blended with different hydrocarbon lubricating oils and following results observed:

|  | First oil | | | Second oil | |
| --- | --- | --- | --- | --- | --- |
|  | Original | 1% blend | 2% blend | Original | 1% blend |
| Gravity °A. P. I | 30 | 29.8 | 30.1 | 27.7 | 27.6 |
| Flash °F | 420 | 420 | 420 | 445 | 445 |
| Saybolt viscosity @ 100° F | 189 | 203 | 215 | 508 | 525 |
| Saybolt viscosity @ 210° F | 47 | 49 | 50 | 67 | 68 |
| Viscosity index | 112 | 124 | 125 | 108 | 109 |
| Color—A. S. T. M | 2¾ | 3¼ | 2¾* | 7½ | 7½ |
| Pour point °F | 25 | −15 | Below −20 | 20 | −5 |
| Carbon residue percent | .09 | .08 | .11 | .71 | .70 |
| Demulsibility @ 130° F | 1500 | 1500 | 1500 |  |  |
| Oxidation stability (mg. sludge/10 gr. oil—16 hrs. @ 392° F.) |  |  |  | 5 | 3 |

* This blend filtered thru a bed of Floridin clay to improved color.

EXAMPLE III

In this experiment, the source material for the desired hydrocarbons was a drip oil obtained in the manufacture of water gas and fractionated to provide a 70% cut having the following characteristics, viz: A. P. I. gravity 27.4, initial boiling point 208° F., and final boiling point 406° F. This fraction proved to be substantially 100% unsaturates and aromatics.

The steps and reaction conditions of the two preceding examples were then repeated, 18 liters of solvent naphtha and 1000 grams of crepe rubber being used to form a rubber gel to which 9 liters of the above water gas drip oil fraction were added. As before, 230 grams of anhydrous aluminum chloride were added portion-wise to effect a catalytic conversion which eventually yielded 3300 grams of a synthetic composition effective to improve certain properties of hydro- The foregoing examples demonstrate the efficacy, in forming synthetic compositions of this character, of hydrocarbons which are activated or induced to undergo chemical change by the presence of anhydrous aluminum chloride. Whereas, in the simple conversion of rubber by the catalytic action of anhydrous aluminum chloride, the maximum possible yield of conversion products is, of course, 100% based on the rubber and actual yields are ordinarily somewhat less than this, here, by our improved method, we obtain yields of valuable synthetic compositions ranging in these four illustrative operations from 160% to 330% based on the rubber. Furthermore, it will be noted that the conversion products of the present invention are remarkably effective in imparting desired properties to lubricating oils, as is demonstrated, for example, by the very substantial reduction in pour point obtained when amounts as low as 1% are blended with various lubricating oils.

The four experiments reported thus far illustrate the feasibility of using certain readily available hydrocarbon mixtures as convenient and economical source material for the hydrocarbon compounds which it is desired to introduce into the rubber conversion reaction. These particular source materials may, of course, be replaced by others as desired; or, as shown in the operation next reported, suitable material from various sources may be combined to furnish the hydrocarbon compounds in question.

EXAMPLE V

Two and one half (2½) liters of Knowles naphtha (the source material of Example IV) and 15 liters of cracking coil naphtha (the source material of Example I) were stirred into a gel previously formed from 1000 grams of crepe rubber and 10 liters of solvent naphtha. This mixture was then subjected to the action of 240 grams of anhydrous aluminum chloride added portion-wise under the reaction conditions obtaining in previous operations, and a bright solution finally was obtained which, upon steam distillation, yielded 2300 grams of a blending composition having the following effect upon lubricating oils.

|  | First oil | | Second oil | |
|---|---|---|---|---|
|  | Original | 1% blend | Original | 1% blend |
| Saybolt Vis. @ 100° F | 189 | 198 | 507 | 530 |
| Saybolt Vis. @ 210° F | 47 | 50 | 67 | 68 |
| Pour point °F | 25 | −15 | 25 | 0 |

As previously indicated, hydrocarbons of the character hereinbefore described may be used with advantage in forming conversion products of rubber in the presence of chlorinated hydrocarbons. The following example is illustrative of this phase of our present invention.

EXAMPLE VI

A refinery gas oil was chlorinated by passing chlorine therethrough until the oil showed a chlorine content of 14% by weight. Two thousand (2000) grams of this chlorinated oil, together with 15 liters of cracking coil naphtha (as used in Example I), was then added to a gel prepared with 1000 grams of crepe rubber and 10 liters of solvent naphtha. The resulting mixture was treated with 240 grams of anhydrous aluminum chloride under the reaction conditions of Example I, and an eventual yield of conversion products in the amount of 3300 grams was obtained. In blends with lubricating oils, the below indicated improvements were observed:

|  | First oil | | Second oil | |
|---|---|---|---|---|
|  | Original | 1% blend | Original | 1% blend |
| Saybolt Vis. @ 100° F | 189 | 197 | 507 | 522 |
| Saybolt Vis. @ 210° F | 47 | 48 | 67 | 67 |
| Pour point °F | 25 | −5 | 25 | 0 |

The utility of our novel compositions of matter has so far been demonstrated, in each example, by blending the same respectively with a neutral oil and with a finished lube oil, both derived from Pennsylvania type crudes. The benefits of our invention, however, are not limited in this respect, but extend likewise to the improvement of oils of different origin, as will be seen from the following examples wherein compositions, formed in accordance with the present invention, were blended respectively with a Mid-Continent oil and with a Columbian oil. In these examples, a composition formed in accordance with Example V, supra, was used, in the amount of 5% by weight, as a blending agent, and the blended oils then passed through fuller's earth.

EXAMPLE VII

*Mid-Continent oil*

|  | Original | 5% blend |
|---|---|---|
| Saybolt viscosity @ 100° F | 293 | 371 |
| Saybolt viscosity @ 210° F | 50 | 56 |
| Viscosity index | 82 | 96 |
| Pour point ° F | 30 | −15 |
| Color—A. S. T. M | 4¾ | 4¼ |

EXAMPLE VIII

*Columbian oil*

|  | Original | 5% blend |
|---|---|---|
| Saybolt viscosity @ 100° F | 309 | 385 |
| Saybolt viscosity @ 210° F | 48 | 54 |
| Viscosity index | 35 | 74 |
| Pour point ° F | −10 | −25 |
| Color—A. S. T. M | 3½ | 4 |

Our invention also may be advantageously practiced according to the following illustrative procedure, wherein the conversion reactions are effected in the presence of a body of lubricating oil. In this instance the oil used was a Pennsylvania neutral oil having the following inspection:

| | |
|---|---|
| Gravity °A. P. I | 30 |
| Saybolt viscosity @ 100° F | 189 |
| Saybolt viscosity @ 210° F | 47 |
| Viscosity index | 112 |
| Four point °F | 25 |

In this operation, 1500 grams of crepe rubber were added to 10,000 ccs. of the above neutral oil and the mixture treated to 430° F. to effect complete solution of the rubber. The rubber-oil solution was then diluted with 60 liters of solvent naphtha; and thereafter were added, 25 liters of cracking coil naphtha (as used in Example I) and 4 liters of Knowles naphtha (as used in Example IV). A 250 gram portion of anhydrous aluminum chloride was added to the mixture while agitating the same, and the temperature maintained at 80° F. for a period of four hours. Heat was then applied to raise the temperature to 160° F. at which point a second 250 gram portion of anhydrous aluminum chloride was introduced, and at the end of one hour the temperature was further increased to 210° F. where it was held for an additional hour.

Following a settling period of twelve hours, the solution was separated from the sludge, treated with lye and water, and subjected to steam distillation to obtain a lubricating oil in the amount of 12,500 ccs. which had the following characteristics:

| | |
|---|---|
| Gravity °A. P. I | 25.5 |
| Saybolt viscosity @ 100° F | 1070 |
| Saybolt viscosity @ 210° F | 110 |
| Viscosity Index | 117 |
| Four point °F | Below −20 |

The above synthetic lube oil resembles a high grade bright stock, having a very low pour point and a high viscosity index. In further experiments, this oil was blended in 4% proportion, with different lubricating oils and was found quite effective in improving the character of each.

|  | First oil | |
|---|---|---|
|  | Original | 4% blend |
| Gravity, ° A. P. I. | 30 | 29.5 |
| Flash, ° F. | 420 | 430 |
| Pour point, ° F. | 25 | −10 |
| Color, A. S. T. M. | 2¾ | 3¾ |
| Saybolt viscosity @ 100° F. | 189 | 194 |
| Saybolt viscosity @ 210° F. | 47 | 48 |

|  | Second oil | |
|---|---|---|
|  | Original | 4% blend |
| Gravity, ° A. P. I. | 28 | 27.7 |
| Flash, ° F. | 445 | 445 |
| Pour point, ° F. | 20 | 0 |
| Color, A. S. T. M. | 7½ | 7¾ |
| Saybolt viscosity @ 100° F. | 508 | 544 |
| Saybolt viscosity @ 210° F. | 67 | 68 |

The residual product obtained by the practice of our invention, as outlined in the illustrative procedures hereinbefore set forth as Examples I to VI inclusive, generally will have the form of a highly viscous liquid or amorphous solid. The physical state of these products apparently depends upon the reaction conditions. In appearance the products range from light yellow to red, depending largely upon the temperature at which the final reduction of the reaction mixture is effected, higher temperatures generally resulting in a darker color for the final product. In all instances, however, these products, whether liquid or solid, are characterized by their particular effectiveness in enhancing the quality of mineral lubricating oil when blended therewith, as has been clearly demonstrated in the several examples by the beneficial effect of the products of the invention upon the pour points and viscosity indices of various oils.

Throughout the several experiments reported in the foregoing description of our invention we have indicated the use of anhydrous aluminum chloride as a desirable catalytic agent in effecting the conversion reactions. It is well known, however, that certain other compounds exhibit catalytic activity of a character substantially equivalent to that of anhydrous aluminum chloride. Compounds or agents of this order are readily determinable from the current technical and scientific literature, and we desire it to be understood therefore that we contemplate the practice of our invention in a manner and scope encompassing a reasonable range of known equivalents in respect of the catalytic agent used in our novel method.

We claim:

1. The method of preparing synthetic compositions useful for blending with lubricating oils, which comprises subjecting rubber, at moderately elevated temperatures and in the presence of one or more other hydrocarbons, to the action of anhydrous aluminum chloride, said other hydrocarbons including at least one which reacts in the presence of anhydrous aluminum chloride at the prevailing temperatures.

2. The method of preparing synthetic compositions useful for blending with lubricating oils, which comprises subjecting rubber, in the presence of one or more hydrocarbons, to the action of anhydrous aluminum chloride, said other hydrocarbons being selected from the group including the olefines, the diolefines and those hydrocarbons of an aromatic nature which react in the presence of anhydrous aluminum chloride.

3. The method of preparing synthetic compositions useful for blending with lubricating oils, which comprises subjecting rubber, in the presence of one or more reactive unsaturated hydrocarbons, to the action of anhydrous aluminum chloride.

4. The method of preparing synthetic compositions useful for blending with lubricating oils, which comprises subjecting rubber, in the presence of one or more reactive olefinic hydrocarbons, to the action of anhydrous aluminum chloride.

5. The method of preparing synthetic compositions useful for blending with lubricating oils, which comprises subjecting rubber, in the presence of one or more reactive diolefinic hydrocarbons, to the action of anhydrous aluminum chloride.

6. The method of preparing synthetic compositions useful for blending with lubricating oils, which comprises subjecting rubber, in the presence of one or more reactive aromatic hydrocarbons, to the action of anhydrous aluminum chloride.

7. The method of preparing synthetic compositions useful for blending with lubricating oils, which comprises forming an intimate mixture of rubber with one or more reactive unsaturated hydrocarbons, acting upon such mixture with anhydrous aluminum chloride, removing the catalyst, and thereafter recovering from the reaction mixture a residual product in the form of a highly viscous liquid or amorphous solid.

8. In a method as claimed in claim 7, the step which comprises introducing the catalyst portion-wise during the course of the reaction.

9. In a method, as claimed in claim 7, the step which comprises heating the mixture during the course of the reaction to moderately elevated temperatures not greatly in excess of 210° F.

10. The method of preparing synthetic compositions useful for blending with lubricating oils, which comprises forming an intimate mixture of rubber with one or more reactive unsaturated hydrocarbons, acting upon such mixture with anhydrous aluminum chloride, said catalyst being introduced portion-wise during the course of the reaction, raising the temperature of the reaction mixture after each addition of catalyst but avoiding a final temperature greatly in excess of 210° F., removing the catalyst, and thereafter recovering a residual product in the form of a highly viscous liquid or amorphous solid.

11. The method of preparing synthetic compositions useful for blending with lubricating oils, which comprises forming an intimate mixture of rubber with one or more reactive unsaturated hydrocarbons, and acting upon such mixture with anhydrous aluminum chloride, said catalyst being used in amounts of the order of 25% by weight of the rubber present in said mixture.

12. The method of preparing synthetic compositions useful for blending with lubricating oils, which comprises forming an intimate mixture of rubber with one or more reactive hydrocarbons of an unsaturated nature, acting upon such mixture with anhydrous aluminum chloride, heating the reaction mixture in successive stages during the course of such catalytic action, removing the catalyst, and thereafter recovering a residual synthetic composition from the catalyst-free reaction mixture.

13. The method of preparing synthetic compositions useful for blending with lubricating oils, which comprises forming an intimate mixture of rubber with one or more reactive hydrocarbons of an unsaturated nature, acting upon such mixture with anhydrous aluminum chloride, said catalyst being introduced portion-wise at successive stages of the reaction, heating the reaction mixture in successive stages during the course of such catalytic action first to a temperature of the order of 160° F. and subsequently to a final temperature not greatly in excess of 210° F., cooling the reaction mixture and removing the catalyst therefrom, and thereafter recovering a residual synthetic composition from the catalyst-free reaction mixture.

14. A method as claimed in claim 13, characterized in that the respective stages of catalyst introduction and of heating are alternated.

15. A method as claimed in claim 13, characterized in that the respective stages of catalyst introduction and of heating are alternated, the first heating stage following the introduction of the first portion of catalyst.

16. The method of producing lubricating oils, which comprises dissolving rubber in hydrocarbon oil, adding thereto one or more reactive hydrocarbons of an unsaturated nature, acting upon the resultant mixture of rubber, oil, and hydrocarbon with anhydrous aluminum chloride, and thereafter treating the reaction mixture to remove the catalyst and to obtain an improved lubricating oil having a lower pour point and a higher viscosity index than the original hydrocarbon oil.

17. The method of producing lubricating oils, which comprises dissolving rubber in viscous hydrocarbon oil heated to facilitate complete solution, diluting the rubber-oil solution with a fluid such as solvent naphtha, adding to the diluted solution one or more reactive unsaturated hydrocarbons, acting upon the resultant mixture with anhydrous aluminum chloride, said catalyst being introduced portion-wise during the course of the reaction, heating the reaction mixture at successive stages of such catalytic reaction to a final temperature not greatly in excess of 210° F., and thereafter treating the reaction mixture to remove the catalyst and solvent and to obtain an improved lubricating oil having a lower pour point and a higher viscosity index than the original hydrocarbon oil.

18. An improved lubricant comprising a blend of a major proportion of viscous hydrocarbon oil and a minor proportion of products obtained by subjecting rubber, at moderately elevated temperatures and in the presence of one or more other hydrocarbons, to the action of aluminum chloride, such other hydrocarbons including at least one which reacts at the prevailing temperatures.

19. An improved lubricant comprising a blend of a major proportion of a viscous hydrocarbon oil and a minor proportion of products obtained by acting upon rubber, while in the presence of one or more hydrocarbons selected from the group including the olefines, the di-olefines, and those hydrocarbons of an aromatic nature which react in the presence of anhydrous aluminum chloride, with anhydrous aluminum chloride under temperature conditions effective to provide conversion products of said rubber and hydrocarbons having pour point lowering properties.

20. An improved lubricant comprising a blend of a major proportion of viscous hydrocarbon oil and a minor proportion of highly viscous liquid or amorphous solid products obtained by forming an intimate mixture of rubber with one or more reactive unsaturated hydrocarbons, adding aluminum chloride, and effecting a conversion with the aid of heat.

21. An improved lubricant having as a major constituent a viscous hydrocarbon oil and containing, in relatively minor proportion based on the amount of said oil, products obtained by acting simultaneously upon a rubber material and reactive unsaturated hydrocarbons with anhydrous aluminum chloride under conditions effective to produce conversion products of said rubber and hydrocarbons having pour point lowering and viscosity index raising properties.

22. An improved lubricant having as a major constituent a viscous hydrocarbon oil and containing, in relatively minor proportion based on the amount of said oil, aluminum chloride conversion products of rubber which are formed in the presence of one or more reactive hydrocarbons of an unsaturated nature, and are characterized by effectiveness in substantially lowering the pour point of wax containing oils.

23. In a method of producing lubricating oils, the improvement which comprises dissolving rubber in hydrocarbon oil, adding thereto one or more reactive hydrocarbons of an unsaturated nature, and acting upon the resultant mixture of rubber, oil and hydrocarbon with anhydrous aluminum chloride under conditions effective to produce an improved lubricating oil having a lower pour point and a higher viscosity index than the original hydrocarbon oil.

24. A stable synthetic hydrocarbon composition characterized by its property of reducing the pour point of wax containing hydrocarbon oils when blended therewith and comprising anhydrous aluminum chloride conversion products of rubber produced in the presence of unsaturated reactive hydrocarbons under conditions effective to impart pour point lowering properties to said conversion products.

25. A stable synthetic hydrocarbon composition characterized by its property of reducing the pour point of wax containing hydrocarbon oils when blended therewith and comprising conversion products obtained by acting upon an intimate mixture of rubber and reactive unsaturated hydrocarbons with anhydrous aluminum chloride, and heating the reaction mixture.

ERICH M. STEFFEN.
JOHN E. SCHOTT.

CERTIFICATE OF CORRECTION.

Patent No. 2,142,220.

January 3, 1939.

ERICH M. STEFFEN, ET AL.

It is hereby certified that error appears in the printed specification of the above numbered patent requiring correction as follows: Page 1, first column, line 17, for the word "composition" read compositions; page 3, second column, lines 41 and 72, in the table, for "Four point" read Pour point; page 4, first column, line 4, before the table, insert the word and colon Thus:; page 5, second column, lines 52 and 53, claim 24, for "unsaturated reactive" read reactive unsaturated; and that the said Letters Patent should be read with this correction therein that the same may conform to the record of the case in the Patent Office.

Signed and sealed this 7th day of March, A. D. 1939.

(Seal)

Henry Van Arsdale.
Acting Commissioner of Patents.